No. 741,801. PATENTED OCT. 20, 1903.
J. LEMLE.
SPIRIT LEVEL.
APPLICATION FILED MAY 3, 1902.
NO MODEL.

Witnesses
Inventor
Jacob Lemle.
Per J. N. Clouse
Atty.

No. 741,801.

Patented October 20, 1903.

UNITED STATES PATENT OFFICE.

JACOB LEMLE, OF TOLEDO, OHIO, ASSIGNOR OF THREE-FOURTHS TO JOHN C. JONES, HUBERT A. SHANKS, AND HASKELL J. WARREN, OF SYLVANIA, OHIO.

SPIRIT-LEVEL.

SPECIFICATION forming part of Letters Patent No. 741,801, dated October 20, 1903.

Application filed May 3, 1902. Serial No. 105,745. (No model.)

*To all whom it may concern:*

Be it known that I, JACOB LEMLE, a citizen of the United States, residing at Toledo, in the county of Lucas and State of Ohio, have invented certain new and useful Improvements in Spirit-Levels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in spirit-levels in which the necessary parts are made adjustable, so that it may be used for leveling surfaces, plumbing vertical work, laying incline surfaces to a scale or pitch, and erecting tapered work one or more degrees out of plumb; and the objects of my improvement are, first, to provide in one tool these various advantages; second, to cushion the spirits-vial and confine it in a hanger made adjustable by a screw, so that the surface-leveling part is easily adjusted to a scale of the one-fourth-inch pitch or fall to twelve inches length for laying drains, incline floors, &c.; third, to make the spirits-vial and its hanger adjustable by degrees on the plumbing part for laying tapered walls of stacks, stand-pipes, &c.; fourth, to combine all of these improved features in a tool that is practical to make, perfectly reliable to use, and comparatively cheap to put on the market, and, fifth, to make a level-vial adjustable and applicable to all kinds of instruments by means of rubber cushions around vial. I attain these objects by the mechanism illustrated in the accompanying drawings, in which—

Figure 1:
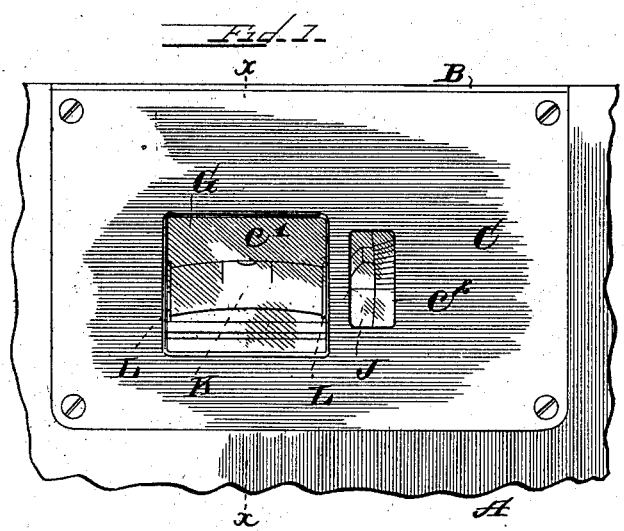
Figure 2:
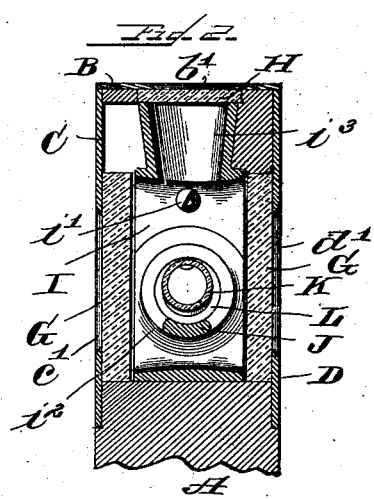
Figure 3:
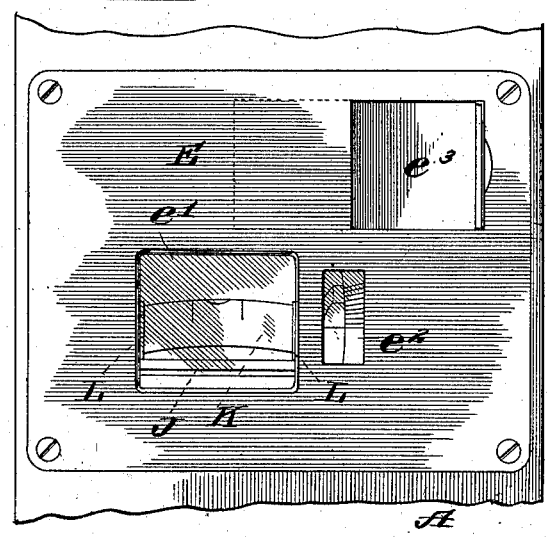
Figure 4:
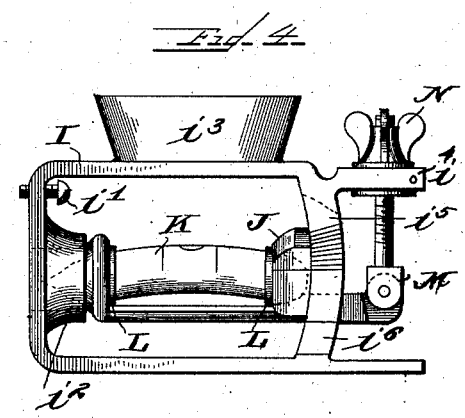
Figure 5:
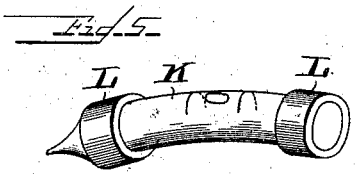
Figure 6:
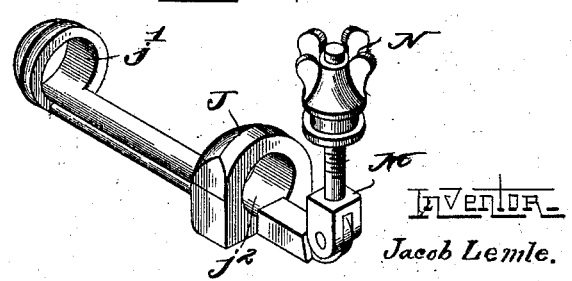

Figure 1 is a side view showing a portion of the beam with the mechanism of the leveling part attached. Fig. 2 is a cut section across the beam and the leveling parts, taken on the line X X, Fig. 1. Fig. 3 is a side view of the plumbing part, showing a portion of the beam and the mechanism of the plumbing part set crosswise of the beam. Fig. 4 is a side view of the internal frame removed, with the spirits-vial and its adjusting parts. Fig. 5 is a perspective view of the spirits-vial with the rubber-cushion rings on it. Fig. 6 is a perspective view of the adjustable hanger with its jointed bolt and flanged wing-nut attached.

Similar letters refer to similar parts throughout the several views.

Referring to the drawings, A represents a portion of the beam, which may be made of wood or metal of any desired size or length, and the leveling and the plumbing parts may be set in it at any point desired. A mortise is made in the beam A large enough to receive the internal frame I, with its various parts, as shown in Fig. 4, also the glass plates G G and H, as shown in Fig. 2, which are covered by sheet-metal plates B, C, D, and E, which plates are screwed to the wooden beam, which plates are also provided with suitable openings $b'$ $c'$ $c^2$ $d'$ $e'$ $e^2$ over the glass, so as to observe through the glass plates the movement of the bubble in the spirits-vial and the scale and degree marks on the internal frame I. In the plate B and the plate E a slide-door $e^3$ is arranged to slide behind the plate and make an opening through which to adjust the hanger J by the wing-nut N, a portion of the metal plate of the opening on its two opposite sides being turned inside and a groove made in it for the edges of the door to slide in, the door being only essential to keep the dust and dirt out of the works. The internal frame I is provided with various parts, as follows: a binding-screw $i'$ to press against the side of the mortise to hold the frame in any desired place in it firmly, a socket-seat $i^2$ for the end of the adjustable hanger J, an oval tubular extension $i^3$, extending up to the glass plate H above, a forked bearing $i^4$, which is shown edgewise in Fig. 4, in which the wing-nut N has its bearing, the wing-nut being provided with a shoulder above and a flange below the forked bearing, and a pin is passed through the two arms of the fork to retain the nut in the fork, the wing-nut N, with its flange below and shoulder above, being shown separate in Fig. 6. The internal frame I is further provided with a curved tie-bar forming a part of the frame, and a segment-arm $i^5$ for the scale-marks being directly over it, leaving a slot-space between the two for the arm of the hanger J to slide in. The opening $i^6$ at the end of the segment is made for the purpose of getting the hanger into the slot, the hanger J showing in Fig. 6 a square portion between its hinge and its band $j^2$ that works in the said slot.

The hanger J consists of two bands $j'$ and $j^2$, connected by a bar. The band $j'$ is rounded over to fit the socket $i^2$ in the frame I. The other band $j^2$ is curved on its outside edge to fit the curve of the segment-arm $i^5$, and an arm extends through the slot-space and terminates in a hinge-ear, to which the jointed bolt M, with its wing-nut N, is pivoted. Rubber-cushion bands L L are inserted in the tubular bands $j'$ $j^2$, and into them the spirits-vial K is forced, care being taken to have the round side of the vial up. Then the hanger J is placed with its round end in the socket $i^2$ in the frame I and passed down through the opening $i^6$ and under the segment-arm $i^5$ into the slot, as seen in Fig. 4. Then the bolt M is put into the flanged wing-nut N and placed in the forked bearing $i^4$ in the frame I and connected to the hanger J by a pin. Now the level complete is placed on a leveled table, and by turning the wing-nut N the bubble is brought to its level and proper position between the two lines on the vial. While in this position a line drawn across the hanger-band and the segment-arm $i^5$ forms the base of the scale, and the other lines are made by elevating to equal adjustments one end of the beam on a leveled table and bringing the bubble to a level each time before marking the segment-arm. This description for correctly laying out the level-scale is based on a twelve-inch length of beam with an elevation of one-fourth inch under the end of the beam for each scale-mark. This would give a one-fourth-inch additional incline to the beam for each scale-mark, and it could be set to make any desired incline up to two inches to the foot. Now when it is thus all complete any desired adjustment may be made by opening the slide-door in the plate B and rotating the wing-nut N, and also the plumb part of my invention may be graduated by placing the beam against a perfectly-plumb surface and adjusting the spirits-vial so that the bubble comes to its proper position between the two marks on the vial and then putting on the base-line of the scale, as before, and then making the other lines from the degree-scale, and when it is thus all complete the desired adjustment may be made by opening the slide-door $e^3$ and rotating the wing-nut N. By this construction of a spirit-level I obtain the special advantages of the ease in setting a level-glass over the old way of setting with plaster-of-paris. The glass is less liable to be broken by a sudden jar, and the setting of the glass in cushioned bearings in a hanger and then controlling the movement of the hanger by a very fine screw adjustment make it possible for the workman to do more difficult and better work in laying incline surfaces and drains and in all deflections from a plumb or vertical line. The same is applicable to level-glasses on surveying instruments.

Having thus described the construction and the operation of my invention and the relation of the various parts to each other, so that any one skilled in the art could make and operate the same and any one skilled in the use of a spirit-level could use the same, what I claim as new, and desire to secure by Letters Patent, is—

1. In a spirit-level for all uses, a spirits glass vial cushioned by rubber rings in an adjustable hanger supported at both ends in a frame, one end in a socket and the other in a slot, and said hanger pivoted to a bolt having a wing-nut on it which is secured in a forked bearing in the frame, as a means of adjusting said hanger in the frame, as shown and specified.

2. In a spirit-level for all uses, a metal frame secured in a wooden beam and provided with an adjustable hanger socketed at one end in said frame, and sliding in a slot and against a segment-arm at the other end, having a glass spirits-vial secured in it in rubber cushions, the said hanger pivoted to a bolt having a flanged wing-nut, and working in a forked bearing on the said frame, as pointed out and described.

3. In a spirit-level for all uses, the combination of a wooden beam provided with a mortise covered by exterior plates and glasses, an internal frame of metal mounted in said mortise and provided with a segment, and scale, and a forked bearing in which the wing-nut is mounted, and a socket and slide bearing in which is mounted the adjustable metal hanger provided with rubber-cushion rings in which is seated a spirits-glass vial, said hanger being pivoted to a bolt which connects it to the wing-nut, by means of which the hanger is adjusted in the frame as shown and described.

4. In a spirit-level for all uses, the combination of a beam provided with a mortise covered by external plates and glasses, and openings in said plates, through which to observe the movements of the bubble in the spirits-vial and the scale for the adjustment of the hanger, an internal frame of metal mounted in said mortise and provided with a forked bearing in which the wing-nut is mounted, a socket and slide bearing in which the adjustable hanger is mounted and a spirits-vial cushioned in rubber rings in said hanger, and a pivoted bolt connecting the hanger to the wing-nut by means of which the hanger is adjusted in the frame to the scale on its segment, as shown and specified.

5. In a spirit-level the combination of the wooden beam provided with a mortise and external glasses and perforated plates covering said mortise, the metal frame provided with the scale and the forked bearing secured in said mortise, the adjustable hanger mounted in said frame and adjusted to the scale on said frame, the bolt pivoted to the adjustable hanger, and the wing-nut threaded to it and mounted in the said forked bearing for adjusting the hanger to the scale, and the spirits-vial mounted in rubber-cushion rings in said hanger, all substantially as shown and specified.

In testimony whereof I affix my signature in presence of two witnesses.

JACOB LEMLE.

Witnesses:
FRANK VOLLMAR,
WILLIAM ADAIR.